(12) United States Patent
Oketani et al.

(10) Patent No.: US 8,155,173 B2
(45) Date of Patent: Apr. 10, 2012

(54) MOBILE COMMUNICATION SYSTEM, TRANSMITTING EQUIPMENT AND TRANSMISSION SIGNAL GENERATION METHOD

(75) Inventors: Kengo Oketani, Minato-ku (JP); Yoshikazu Kakura, Minato-ku (JP)

(73) Assignee: NEC Corporation, Tokyo (JP)

( * ) Notice: Subject to any disclaimer, the term of this patent is extended or adjusted under 35 U.S.C. 154(b) by 1161 days.

(21) Appl. No.: 11/924,683

(22) Filed: Oct. 26, 2007

(65) Prior Publication Data
US 2008/0101507 A1 May 1, 2008

(30) Foreign Application Priority Data

Oct. 31, 2006 (JP) ................................ 2006-295947
Sep. 6, 2007 (JP) ................................ 2007-231376

(51) Int. Cl.
*H04B 1/38* (2006.01)
*H04L 5/16* (2006.01)

(52) U.S. Cl. ......... 375/219; 375/343; 370/203; 370/210

(58) Field of Classification Search .................. 375/219, 375/343; 370/203–211
See application file for complete search history.

(56) References Cited

U.S. PATENT DOCUMENTS

| | | | | |
|---|---|---|---|---|
| 5,812,615 | A * | 9/1998 | Baum et al. ................... | 375/344 |
| 6,754,261 | B1 * | 6/2004 | Liu et al. ....................... | 375/232 |
| 2005/0265275 | A1 | 12/2005 | Howard et al. | |
| 2006/0098752 | A1 * | 5/2006 | Song et al. .................... | 375/260 |
| 2006/0167784 | A1 | 7/2006 | Hoffberg | |
| 2007/0230600 | A1 * | 10/2007 | Bertrand et al. .............. | 375/260 |
| 2007/0253465 | A1 * | 11/2007 | Muharemovic et al. ...... | 375/130 |

FOREIGN PATENT DOCUMENTS

| | | | |
|---|---|---|---|
| JP | 2003-152670 | A | 5/2003 |
| JP | 2003-318856 | A | 11/2003 |
| JP | 2003-338775 | A | 11/2003 |
| WO | WO 2006/021227 | A1 | 3/2006 |
| WO | 2007126793 | A2 | 11/2007 |

OTHER PUBLICATIONS

XP002468855: NEC Group, "Definition of Cyclic Shift in Code Division Multiplexing", 3GPP TSG RAN WG1, Meeting #47, [Online] Retrieved from the Internet: URL:http://www.3gpp.org/ftp/tsg_ran/WG1_RL1/TSGR1_47//Docs/R1-063202.zip> {retrieved on Feb. 2, 2008], Nov. 6, 2006, pp. 1-3, vol. R1-062766.

XP003002423: NEC Group, "Consideration on uplink pilot design using CAZAC", 3GPP TSG-RAN, Meeting #44, Mar. 27-31, 2006, pp. 1-5, vol. R1-60831.

(Continued)

*Primary Examiner* — Curtis Odom
(74) *Attorney, Agent, or Firm* — Sughrue Mion, PLLC (57) ABSTRACT

A transmitting equipment is used in a mobile communication system in which a signal obtained by cyclically shifting a predetermined sequence is used for communication. An inverse fast Fourier transform device of the transmitting equipment converts a signal obtained by signal processing on a predetermined sequence in a frequency region into a time region by inverse fast Fourier transform. A cyclic shift device cyclically shifts by a predetermined amount of shift the sequence in the signal converted into the time region by the inverse fast Fourier transform device.

12 Claims, 6 Drawing Sheets

OTHER PUBLICATIONS

R1-060373: Comparison of Proposed Uplink Pilot Structures for SC-OFDMA, 3GPP TSG RAN WG1#44, Denver, Co, Feb. 13-17, 2006.

"3GPP TR 25.814 V7.1.0; 3rd Generation Partnership Project; Technical Specification Group Radio Access Network; Physical layer aspects for evolved Universal Terrestrial Radio Access (UTRA)", Sep. 2006, pp. 71-77.

Office Action dated Jan. 4, 2012, issued by the Japanese Patent Office in counterpart Japanese Application No. 2007-231376.

Texas Instruments, "Non synchonized Random Access structure for E-UTRA", 3GPP TSG RAN WG1 #46bls R1-062630, Oct. 13, 2006, pp. 1-7.

* cited by examiner

MOBILE COMMUNICATION SYSTEM, TRANSMITTING EQUIPMENT AND TRANSMISSION SIGNAL GENERATION METHOD

This application is based upon and claims the benefit of priority from Japanese Patent Application No. 2006-295947 filed on Oct. 31, 2006 and Japanese Patent Application No. 2007-231376 filed on Sep. 6, 2007, the contents of which are incorporated by references.

BACKGROUND OF THE INVENTION

1. Field of the Invention

The present invention relates to communication between a base station and terminal equipments in a mobile communication system.

2. Description of the Related Art

On the air interface between a base station and terminal equipments in a Long Term Evolution (LTE) mobile communication system, control signals and data signals are transmitted over various channels according to the kinds of the signals. For example, a random access channel (RACH) is mapped to a physical random access channel (PRACH) and a preamble and a message are transmitted over the RACH. Over a physical uplink shared channel (PUSCH), an upstream data signal is transmitted. Over a physical uplink control channel (PUCCH), an upstream control signal is transmitted. Each of reference signals contained in the frames on the PUSCH and the PUCCH and the preamble on the RACH is a signal of a predetermined pattern.

The base station detects the reference signal on the PUSCH or the PUCCH to enable, for example, compensation for attenuation of the upstream data signal and the upstream control signal from each terminal equipment. Also, the base station can recognize access from each terminal equipment by detecting the preamble on the RACH.

In the LTE mobile communication system, code division multiplexing (CDM) is performed for multiplexing transmission of reference signals from a plurality of terminal equipments in the same bandwidth. In CDM, a cyclic shift specific to each terminal equipments is used to enable the plurality of terminal equipments to share the same Zadoff-Chu sequence (ZC sequence) while maintaining orthogonality.

In ordinary cases, terminal equipment performs signal processing including Fourier transform and inverse Fourier transform after effecting a cyclic shift of a predetermined ZC sequence, and transmits a signal thereby obtained (see R1-060373: Comparison of Proposed Uplink Pilot Structures For SC-FFOMA, TEXAS INSTRUMENTS, 3GPP TSG RAN WG1#44 Denver, Co, Feb. 13-17, 2006).

Figure 1:
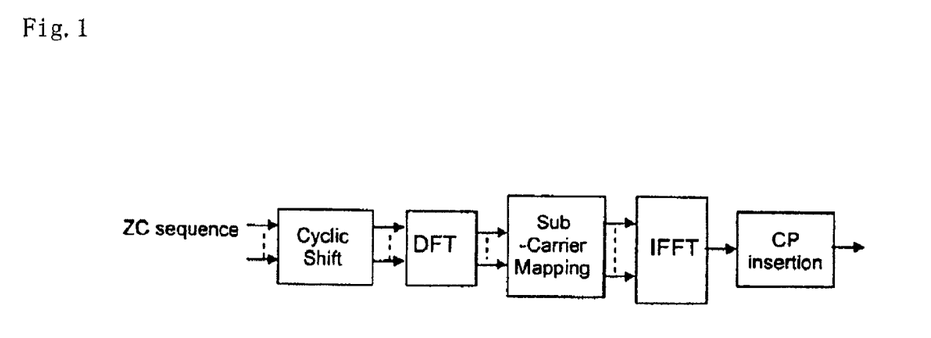
FIG. 1 is a block diagram showing an example of a configuration for terminal equipment made by considering transmission of a reference signal.

FIG. 1 is a block diagram showing an example of a configuration for terminal equipment made by considering transmission of the reference signal. In the example shown in FIG. 1, the terminal equipment effects a cyclic shift specific to the terminal equipment on a predetermined ZC sequence, and thereafter converts the ZC sequence into a frequency region by discrete Fourier transform (DFT). Subsequently, the terminal equipment maps the obtained signal in the frequency region to a subcarrier and then restores the signal in a time region by inverse discrete Fourier transform (IDFT). Finally, the terminal equipment inserts a cyclic prefix (CP) in the signal restored in a time region and transmits the signal.

The base station removes the CP from the signal received from the terminal equipment, thereafter computes the value of crosscorrelation between the received signal and the pattern of the predetermined ZC sequence, and detects the ZC sequence transmitted from the terminal equipment and the cyclic shift of the ZC sequence based on the value of crosscorrelation.

The above-described technique has a problem described below.

It is desirable to simplify the configuration for detecting a pattern formed of a ZC sequence multiplexed by CDM and a cyclic shift and transmitted from a terminal equipment such as that described above. In doing so, a frequency region crosscorrelation method (multi-use channel estimation) is effective, in which a plurality of patterns having the same ZC sequence but having different cyclic shifts are detected in one circuit and the number of circuits is thereby reduced.

Figure 2A:
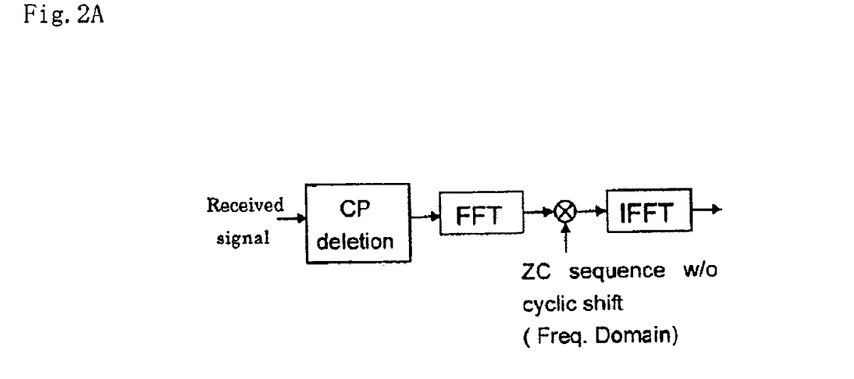
FIG. 2A is a block diagram showing a configuration for a base station in which a configuration for detecting patterns sent from terminal equipments is simplified.
Figure 2B:
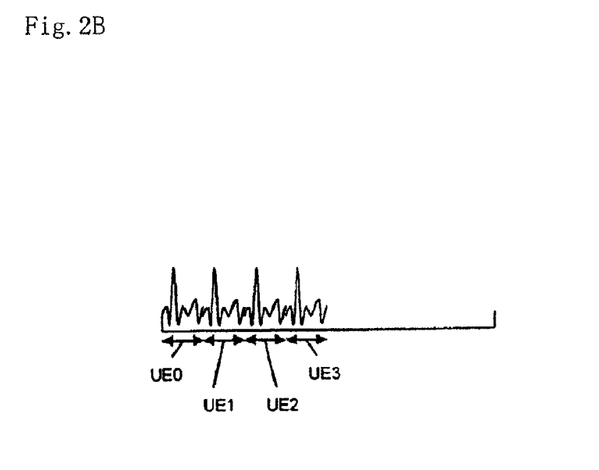
FIG. 2B is a timing chart showing the results of channel estimation by the base station shown in FIG. 2A.

FIG. 2A is a block diagram showing a configuration for the base station in which a configuration for detecting patterns sent from terminal equipment is simplified. The configuration shown in FIG. 2 is made by considering channel estimation. FIG. 2B is a timing chart showing the result of channel estimation with the base station shown in FIG. 2A.

Referring to FIG. 2A, the received signal from which the CP has been removed is first converted into a frequency region by fast Fourier transform (FFT). Subsequently, the received signal in the frequency region and the conjugate complex number of a predetermined ZC sequence not cyclically shifted are multiplied together. Next, the signal obtained as the result of multiplication is converted into a time region by inverse fast Fourier transform (IFFT), thereby obtaining the value of crosscorrelation between the received signal and the predetermined ZC sequence. The ZC sequence transmitted from the terminal equipment is detected from the obtained crosscorrelation value.

A cyclic shift can be considered equivalent to a delay. From a crosscorrelation value delay profile shown in FIG. 2B by way of example, therefore, the amount of cyclic shift applied in each terminal equipment using the same ZC sequence can be detected. In the example shown in FIG. 2B, the peaks of crosscorrelation between terminal equipments UE0 to UE3 using different cyclic shifts with respect to the same ZC sequence appear at different times.

Use of this method makes it possible to obtain at one time the results of channel estimation on a plurality of terminal equipment that each have unique cyclic shifts with respect to the same ZC sequence.

Also, referring to FIG. 2A, not IDFT but IFFT is used to simplify the portion in which the value of crosscorrelation computed in a frequency region is converted into the value of crosscorrelation in a time region.

It is preferable that the number of samples be a prime number or a number having a large prime factor for compatibility with a sufficient number of ZC sequence differing in length.

If, in the base station, not IFFT such as that in FIG. 2A but IDFT corresponding to DFT in the terminal equipment is used, the number of samples for cyclic shift by the terminal equipment can be set in correspondence with an integral number of samples of the IDFT output in the base station. In such case, however, the configuration for inverse Fourier transform in the base station becomes complicated.

In the case shown in FIG. 2A, the configuration for inverse Fourier transform is simplified by using IFFT in the base station. However, this results in noncoincidence between the number of samples for cyclic shift by the terminal equipment and the integer number of samples of the IFFT output in the base station.

Figure 3:
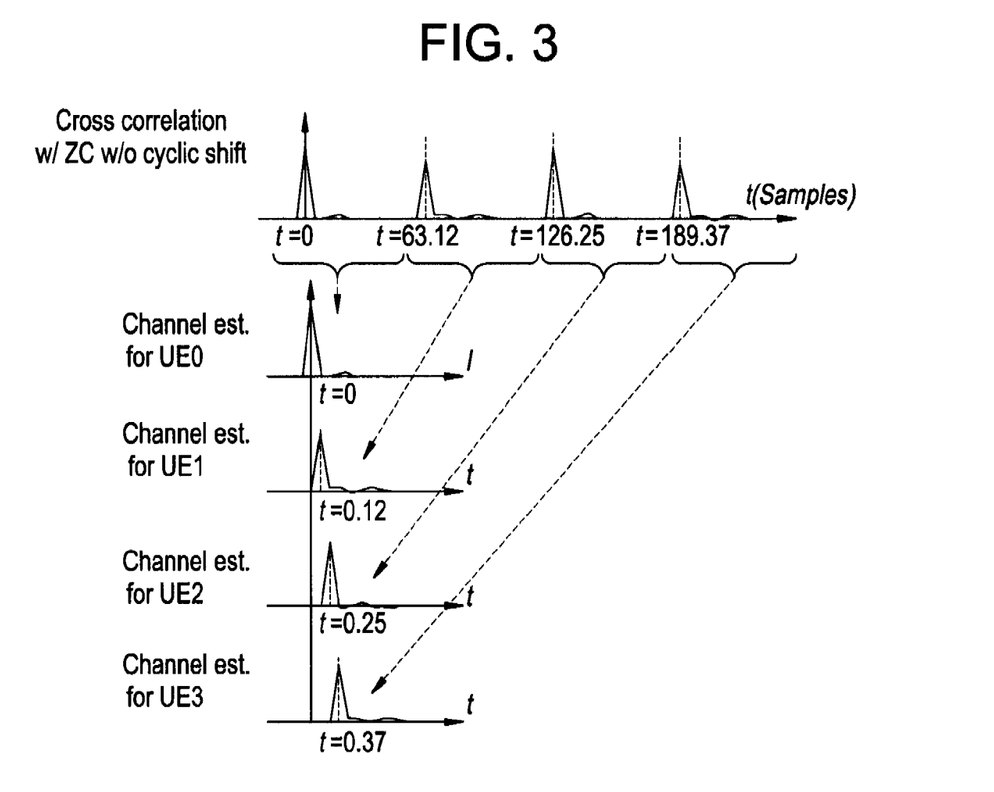
FIG. 3 is a diagram showing an example of multi-user channel estimation according to a mobile communication system having terminal equipment shown in FIG. 1 and the base station shown in FIG. 2A.

FIG. 3 is a diagram showing an example of multi-user channel estimation according to the mobile communication system having the terminal equipment shown in FIG. 1 and the base station shown in FIG. 2A. It is assumed that in this example terminal equipment UE0, UE1, UE2, and UE3 cyclically shift the same ZC sequence by amounts corresponding to 0, 18, 36 and 54 DFT samples, respectively, and that the DFT size (the number of samples) is 73 and each of the FFT size and the IFFT size is 256.

The rate of sampling in the IFFT output in the base station is 256/73 of the rate of sampling in the DFT input in terminal equipment. Accordingly, the amounts of cyclic shift by terminal equipment UE0, UE1, UE2, and UE3 correspond to 0, 63.12, 126.25 and 189.37 samples of the IFFT output in the base station. Values which are the results of subtraction of the integer portions from these values appear as timing errors in the results of channel estimation on terminal equipment UE. It can be understood that, as shown in FIG. 3, the results of channel estimation on terminal equipment UE other than terminal equipment UE0 contain timing errors smaller than the amount for 1 sample. More specifically, the result of channel estimation on UE1 contains a timing error corresponding to a 0.12 sample; the result of channel estimation on UE2 contains a timing error corresponding to a 0.25 sample; and the result of channel estimation on UE3 contains a timing error corresponding to a 0.37 sample.

In a case where these channel estimation results are used in demodulation in particular, timing errors act as a cause of a deterioration in demodulation performance. If compensation is made for such timing errors by signal processing in the frequency region, the configuration of the equipment becomes complicated.

SUMMARY OF THE INVENTION

An exemplary object of the present invention is to provide a mobile communication system, transmitting equipment and a transmission signal generation method capable of reducing timing errors with a simple configuration in a method that uses a predetermined pattern obtained by cyclically shifting a sequence.

A mobile communication system provided according to an exemplary aspect of the present invention to achieve the above-described object is a mobile communication system in which a signal obtained by cyclically shifting a predetermined sequence is used for communication, and which has transmitting equipment and receiving equipment.

The transmitting equipment performs signal processing on a signal for the predetermined sequence in a frequency region, converts the signal into a time region by inverse fast Fourier transform, thereafter cyclically shifts the sequence in the signal converted into the time region by a predetermined amount of shift, and transmits the cyclically shifted signal.

The receiving equipment computes the value of crosscorrelation between the signal received from the transmitting equipment and the sequence stored in advance, converts the crosscorrelation value into a time region by inverse fast Fourier transform, and detects the sequence used in the transmitting equipment and the amount of the cyclic shift on the basis of the crosscorrelation value in the time region.

Transmitting equipment according to the exemplary aspect of the present invention is transmitting equipment which is used in a mobile communication system in which a signal obtained by cyclically shifting a predetermined sequence is used for communication. The transmitting equipment has inverse fast Fourier transform means and cyclic shift means.

The inverse fast Fourier transform means converts a signal obtained by signal processing on the predetermined sequence in a frequency region into a time region by inverse fast Fourier transform.

The cyclic shift means cyclically shifts by a predetermined amount of shift the sequence in the signal converted into the time region by the inverse fast Fourier transform means.

A transmission signal generation method according to the exemplary aspect of the present invention is a transmission signal generation method in transmitting equipment used in a mobile communication system in which a signal obtained by cyclically shifting a predetermined sequence is used for communication, the method includes performing signal processing on the predetermined sequence in a frequency region, converting the signal in the frequency region processed by signal processing into a time region by inverse fast Fourier transform, and cyclically shifting the sequence in the signal converted into the time region by a predetermined amount of shift.

The above and other objects, features, and advantages of the present invention will become apparent from the following description with references to the accompanying drawings which illustrate examples of the present invention.

DETAILED DESCRIPTION OF THE PREFERRED EMBODIMENTS

Figure 4:
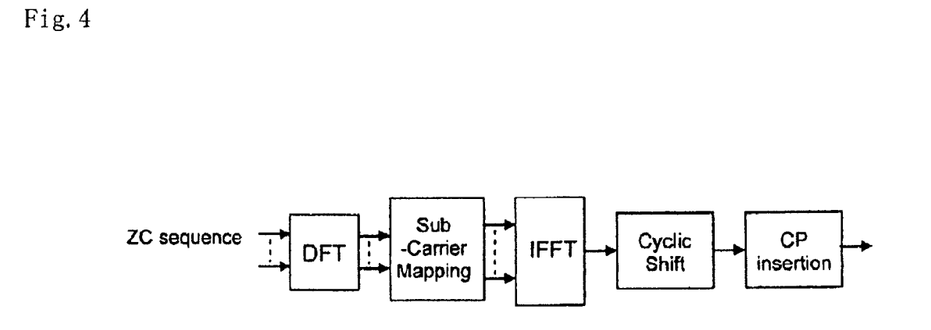
FIG. 4 is a diagram showing a basic configuration of terminal equipment proposed in an exemplary embodiment of the present invention.

FIG. 4 is a diagram showing a basic configuration of terminal equipment proposed in an exemplary embodiment of the present invention. In the exemplary embodiment described below, to avoid a timing error, we propose to perform cyclic shift after inverse fast Fourier transform (IFFT) as shown in FIG. 4 and to define cyclic shift at IFFT. With this definition, the number of samples for cyclic shift is the integer at the output of IFFT in FIG. 2.

Figure 5:
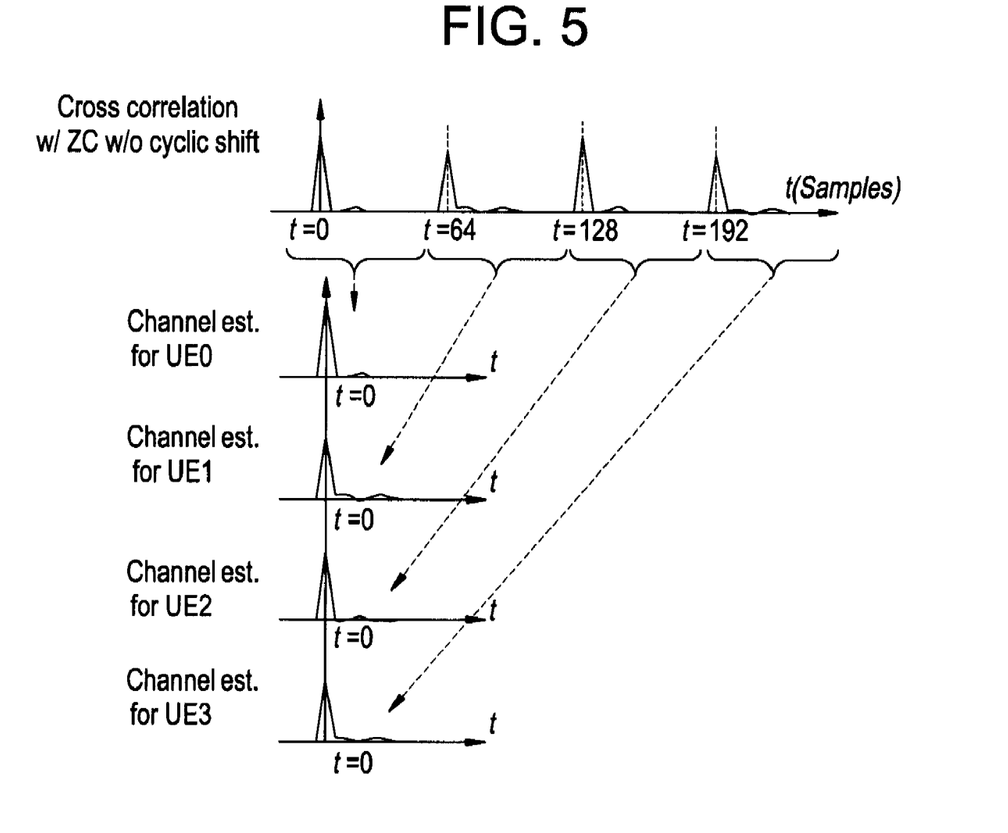
FIG. 5 is a diagram showing an example of multi-user channel estimation using the definition of cyclic shift proposed with reference to FIG. 4.

FIG. 5 shows an example of multi-user channel estimation with proposed cyclic shift in FIG. 4. Referring to FIG. 5, channel estimation results for each terminal equipment can be cut out by the integer number of samples without any timing error.

Definition of cyclic shift is proposed here. With considering simplicity in multi-user channel estimation for EUTRA (evolved-UMTS terrestrial radio access) uplink, we propose to perform cyclic shift after IFFT and to define cyclic shift by sampling at IFFT.

The present exemplary embodiment will be described in detail below.

Figure 6:
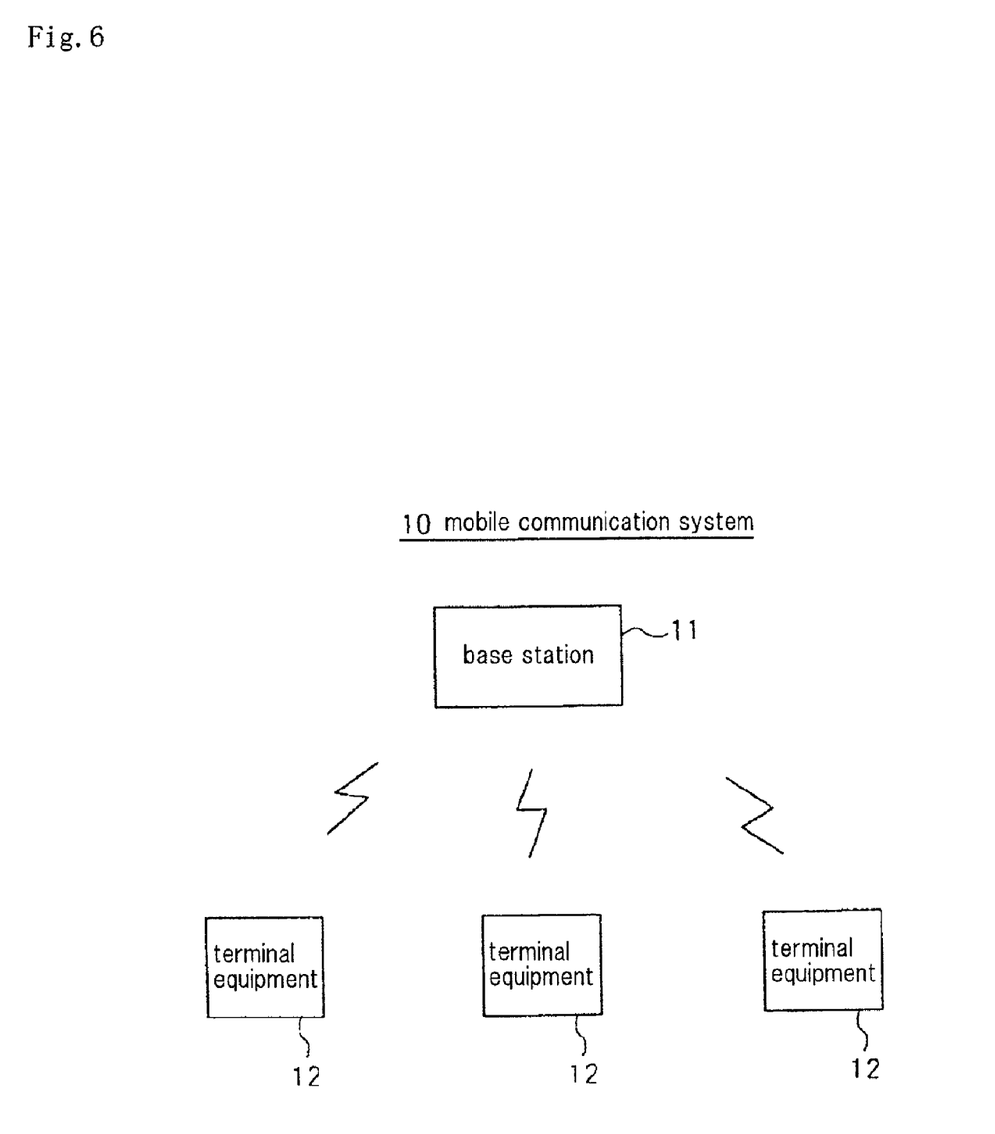
FIG. 6 is a block diagram showing the configuration of a mobile communication system according to an exemplary embodiment of the present invention.

FIG. 6 is a block diagram showing the configuration of a mobile communication system according to an exemplary embodiment of the present invention. Referring to FIG. 6, mobile communication system 10 has base station 11 and terminal equipments 12. Base station 11 and terminal equipments 12 transmit and receive various signals on an air interface. For example, each terminal equipment 12 transmits an upstream data signal to base station 11 over a PUSCH. A frame of the upstream data signal on the PUSCH contains a reference signal. The reference signal is detected in base station 11 and used for compensation for attenuation, for example.

The reference signal is a signal obtained by cyclically shifting a predetermined ZC sequence by a predetermined amount. A plurality of cyclic shifts differing in the amount of shift are defined with respect to one ZC sequence. Base station 11 detects the cyclic shifts as well as the ZC sequence.

Description will be made below by focusing attention on transfer of the reference signal from each terminal equipment 12 to base station 11.

Figure 7:
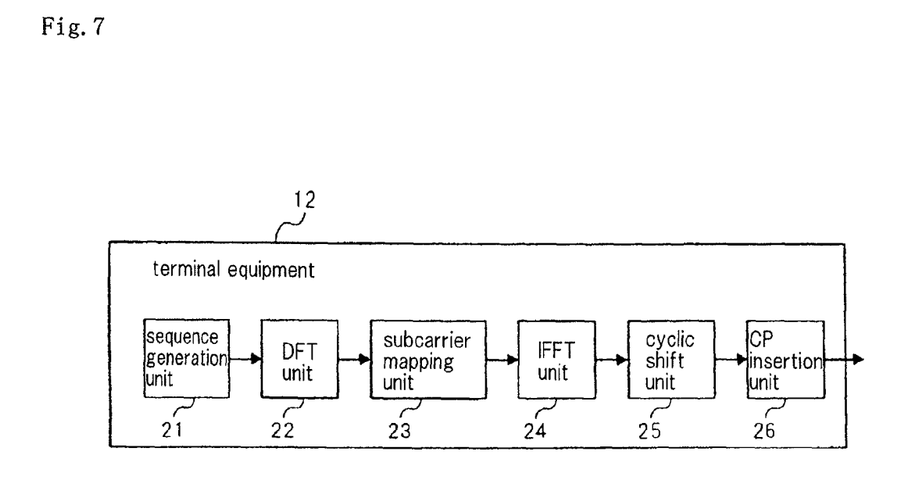
FIG. 7 is a block diagram showing the configuration of terminal equipment 12.

FIG. 7 is a block diagram showing the configuration of terminal equipment 12. Referring to FIG. 7, terminal equipment 12 has sequence generation unit 21, DFT unit 22, subcarrier mapping unit 23, IFFT unit 24, cyclic shift unit 25 and CP insertion unit 26.

Sequence generation unit 21 generates a ZC sequence which is a basis for a pattern to be transmitted as the reference signal to base station 11. The ZC sequence is generated by using a generation polynomial for a Zadoff-Chu zero correlation zone (ZC-ZCZ) sequence.

DFT unit 22 converts a signal containing the ZC sequence in a time region generated by sequence generation unit 21 into a signal in a frequency region by discrete Fourier transform (DFT).

Subcarrier mapping unit 23 maps the signal converted into a frequency region by DFT unit 22 to a predetermined subcarrier. For example, subcarrier mapping unit 23 may map a signal band-limited with a root Nyquist filter or the like to a predetermined subcarrier.

IFFT unit 24 converts the signal in the frequency region mapped to the subcarrier by subcarrier mapping unit 23 into a signal in a time region by IFFT. Cyclic shift unit 25 cyclically shifts the ZC sequence contained in the signal restored in a time region by IFFT unit 24 by an amount corresponding to a predetermined number of samples in the output from IFFT unit 24. Accordingly, a value which can be taken as the amount of cyclic shift is a discrete value dependent on the rate of sampling at the output of IFFT unit 24. The amount of cyclic shift may be specified by the number of samples at the output of IFFT unit 24.

CP insertion unit 26 adds a cyclic prefix (CP), a trailing end portion of the signal in which the ZC sequence has been cyclically shifted by cyclic shift unit 25, as a cyclic prefix (CP) before the head of the signal. The signal to which the CP has been added by CP insertion unit 26 is transmitted onto the PUSCH.

Figure 8:
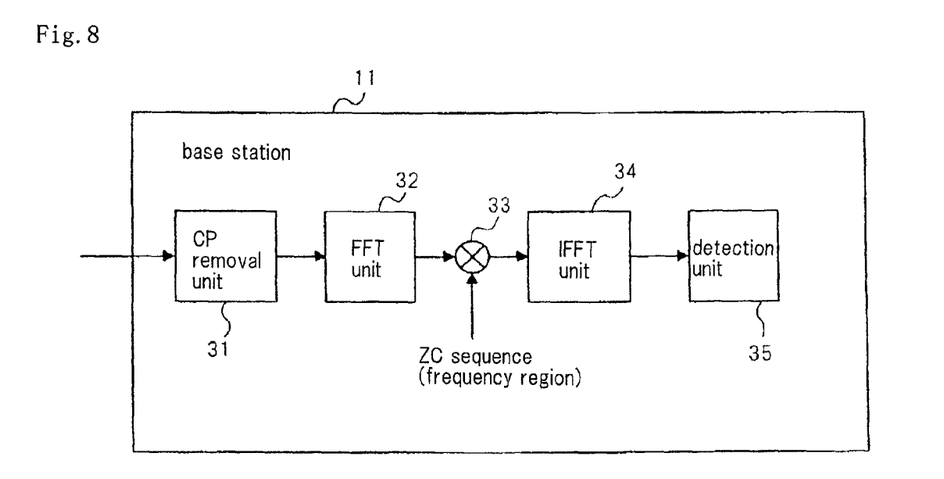
FIG. 8 is a block diagram showing the configuration of base station 11.

FIG. 8 is a block diagram showing the configuration of base station 11. Referring to FIG. 8, base station 11 has CP removal unit 31, FFT unit 32, multiplication unit 33, IFFT unit 34 and detection unit 35.

CP removal unit 31 removes the CP from the signal received on the PUSCH from terminal equipment 12.

FFT unit 32 converts the signal from which the CP has been removed by CP removal unit 31 into a signal in a frequency region by fast Fourier transform (FFT).

Multiplication unit 33 multiplies together a pattern obtained by converting the predetermined ZC sequence into a frequency region and the signal converted into a frequency region by FFT unit 32. The ZC sequence used in this multiplication is the one not cyclically shifted.

IFFT unit 34 converts the signal obtained by multiplication in multiplication unit 33 into a signal in a time region by IFFT. The value of crosscorrelation between the signal received on the PUSCH and the ZC sequence is thereby obtained in the time region. If the pattern of the reference signal transmitted from terminal equipment 12 is a pattern obtained by cyclically shifting the ZC sequence, the amount of cyclic shift appears as the amount of delay at the output of IFFT unit 34. In this exemplary embodiment, the rate of sampling at the output of IFFT unit 34 is assumed to be the same as or a natural number multiple of the rate of sampling at the output of IFFT unit 24 in terminal equipment 12. Accordingly, the amount of cyclic shift at the output of IFFT unit 34 contains no timing error due to a difference in the sampling rate.

Detection unit 35 detects, from the output of IFFT unit 34, the ZC sequence and the cyclic shift of the pattern transmitted as a reference signal from terminal equipment 12. The ZC sequence and the received level of the ZC sequence can be determined from the signal level of peaks of the crosscorrelation value, and the cyclic shift can be determined from the amount of delay of the peaks. The results of detection in detection unit 35 are used, for demodulation of the upstream data signal or for compensation for attenuation of the upstream signal.

According to the exemplary embodiment, as described above, a signal obtained by mapping a predetermined ZC sequence to a subcarrier in a frequency region is processed by IFFT and cyclically shifted in a subsequent stage, and the cyclically shifted signal is transmitted. Thus, the effect of preventing the IFFT output on the receiving side from containing a timing error due to a difference in the sampling rate can be achieved with a simple configuration.

More specifically, in the mobile communication system in which predetermined patterns having a plurality of cyclic shifts are defined with respect to the same ZC sequence, are used for communication, terminal equipment 12 has cyclic shift unit 25 placed after IFFT unit 24, and cyclic shift unit 25 prescribes the amount of cyclic shift of the ZC sequence by the number of samples from the output of IFFT unit 24. In base station 11 configured so that the plurality of patterns obtained by cyclically shifting the same ZC sequence to different extents are detected at one time from the IFFT output, it is therefore possible to prevent the IFFT output from containing a timing error due to a difference in the sampling rate. Also, a timing error due to a difference in the sampling rate is removed from the results of channel estimation (crosscorrelation value) to improve demodulation performance in a case where channel estimation results are used for demodulation.

The present exemplary embodiment has been described with respect to transfer of the reference signal on the PUSCH by way of example. However, the present invention is not limited to this. The present invention can be widely applied to the transfer of signals using a plurality of patterns obtained by applying cyclic shifts that differ in the amount of shift to a predetermined sequence. For example, the present invention can also be applied to a reference signal or to a control signal on a PUCCH or to a preamble on a RACH.

While preferred exemplary embodiments of the present invention have been described using specific terms, such description is for illustrative purposes only, and it is to be understood that changes and variations may be made without departing from the spirit or scope of the following claims.

What is claimed is:

1. A mobile communication system in which a signal obtained by cyclically shifting a predetermined sequence is used for communication, the system comprising:
  a transmitting equipment which performs signal processing on a signal for the predetermined sequence in a frequency region, converts the signal into a time region by inverse fast Fourier transform, thereafter cyclically shifts the sequence in the signal converted into the time region by a predetermined amount of shift, and transmits the cyclically shifted signal; and
  a receiving equipment which computes the value of crosscorrelation between the signal received from the transmitting equipment and the sequence stored in advance, converts the crosscorrelation value into a time region by inverse fast Fourier transform, and detects the sequence used in the transmitting equipment and the amount of the cyclic shift on the basis of the crosscorrelation value in the time region;
  wherein the rate of sampling of the output from the inverse fast Fourier transform in the receiving equipment is a natural number multiple of the rate of sampling of the output from inverse fast Fourier transform in the transmitting equipment.

2. The mobile communication system according to claim 1, wherein the cyclic shift by the predetermined amount of shift is realized by cyclically shifting the output from inverse fast Fourier transform by an amount corresponding to a predetermined number of samples.

3. The mobile communication system according to claim 1, wherein the amount of the cyclic shift is prescribed by the number of samples in the output from inverse fast Fourier transform in the transmitting equipment.

4. The mobile communication system according to claim 1, wherein the transmitting equipment is a terminal equipment and the receiving equipment is a base station.

5. The mobile communication system according to claim 1, wherein the pattern signal obtained by cyclically shifting the sequence is a reference signal used for demodulation of a data signal or a control signal, or a preamble for random access.

6. A transmitting equipment used in a mobile communication system in which a signal obtained by cyclically shifting a predetermined sequence is used for communication, the transmitting equipment comprising:
  an inverse fast Fourier transform unit for converting a signal obtained by signal processing on the predetermined sequence in a frequency region into a time region by inverse fast Fourier transform; and
  a cyclic shift unit for cyclically shifting by a predetermined amount of shift the sequence in the signal converted into the time region by the inverse fast Fourier transform unit;
  wherein an integer multiple of the rate of sampling of the output from the inverse fast Fourier transform unit coincides with the rate of sampling of the output from inverse fast Fourier transform unit in a receiving equipment.

7. The transmitting equipment according to claim 6, wherein the cyclic shift unit realizes the cyclic shift by the predetermined amount of shift by cyclically shifting the output from the inverse fast Fourier transform unit by an amount corresponding to a predetermined number of samples.

8. The transmitting equipment according to claim 6, wherein the amount of the cyclic shift in the cyclic shift unit is prescribed by the number of samples in the output from the inverse fast Fourier transform unit in the transmitting equipment.

9. The transmitting equipment according to claim 6, wherein the transmitting equipment is a terminal equipment which transmits an upstream signal to a base station.

10. The transmitting equipment according to claim 6, wherein a pattern signal obtained by cyclically shifting the sequence is a reference signal used for demodulation of a data signal or a control signal, or a preamble for random access.

11. A transmitting equipment used in a mobile communication system in which a signal obtained by cyclically shifting a predetermined sequence is used for communication, the transmitting equipment comprising:
  inverse fast Fourier transform means for converting a signal obtained by signal processing on the predetermined sequence in a frequency region into a time region by inverse fast Fourier transform; and
  cyclic shift means for cyclically shifting by a predetermined amount of shift the sequence in the signal converted into the time region by the inverse fast Fourier transform means;
  wherein the rate of sampling of the output from an inverse fast Fourier transform in a receiving equipment is a natural number multiple of the rate of sampling of the output from the inverse fast Fourier transform means in the transmitting equipment.

12. A transmission signal generation method in a transmitting equipment used in a mobile communication system in which a predetermined sequence is cyclically shifted to be used for communication, the method comprising:
  performing signal processing on a predetermined sequence in a frequency region;
  converting the signal in the frequency region processed by signal processing into a time region by inverse fast Fourier transform; and
  cyclically shifting the sequence in the signal converted into the time region by a predetermined amount of shift;
  wherein the rate of sampling of the output from an inverse fast Fourier transform in a receiving equipment is a natural number multiple of the rate of sampling of the output from the inverse fast Fourier transform in the transmitting equipment.

* * * * *